United States Patent
Slade (10) Patent No.: US 11,049,633 B2
(45) Date of Patent: Jun. 29, 2021

(54) CENTRAL COLUMN OF TOROIDAL FIELD COIL

(71) Applicant: Tokamak Energy Ltd, Oxfordshire (GB)

(72) Inventor: Robert Slade, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 0 days.

(21) Appl. No.: 16/965,791

(22) PCT Filed: Jan. 30, 2019

(86) PCT No.: PCT/GB2019/050248
§ 371 (c)(1),
(2) Date: Jul. 29, 2020

(87) PCT Pub. No.: WO2019/150098
PCT Pub. Date: Aug. 8, 2019

(65) Prior Publication Data
US 2020/0381154 A1   Dec. 3, 2020

(30) Foreign Application Priority Data

Jan. 31, 2018 (GB) ..................................... 1801599

(51) Int. Cl.
*H01F 6/06* (2006.01)
*G21B 1/05* (2006.01)

(52) U.S. Cl.
CPC ............. *H01F 6/06* (2013.01); *G21B 1/057* (2013.01)

(58) Field of Classification Search
CPC ........ H01F 6/00; H01F 2006/001; H01F 6/06; H01F 6/065; G21B 1/00; G21B 1/057
See application file for complete search history.

(56) References Cited

U.S. PATENT DOCUMENTS

2016/0232988 A1   8/2016   Sykes et al.

FOREIGN PATENT DOCUMENTS

| GB | 2519827 A | 5/2015 |
| WO | 2017042543 A1 | 3/2017 |

OTHER PUBLICATIONS

Search Report issued by the United Kingdom Intellectual Prperty Office for Application No. 1801599.0 dated Aug. 1, 2018 (3 pages).
(Continued)

*Primary Examiner* — Marshall P O'Connor
(74) *Attorney, Agent, or Firm* — Michael Best & Friedrich LLP (57) ABSTRACT

An HTS assembly for use in a toroidal field coil having a central column is described. The HTS assembly comprises a plurality of parallel arrays of HTS tapes arranged to pass through the central column, each array comprising a plurality of HTS tapes arranged such that c-axes of all tapes in an array are parallel to each other, and such that planes of the HTS layers of the HTS tapes are perpendicular to a first radius of the central column. Each HTS tape has a c-angle which is an angle between a perpendicular to a plane of an HTS layer of the HTS tape and the c-axis of the tape. The plurality of arrays comprises first and second sets of arrays. Each array within the first set of arrays comprises HTS tapes of a first type having a first c-angle, and each array within the second set of arrays comprises HTS tapes of a second type having a second c-angle which is greater than the first c-angle. The first set of arrays are arranged closer to the first radius than the second set of arrays.

8 Claims, 6 Drawing Sheets

(56) References Cited

OTHER PUBLICATIONS

International Search Report and Written Opinion for Application No. PCT/GB2019/050248 dated Mar. 28, 2019 (12 pages).
International Preliminary Report on Patentability for Application No. PCT/GB2019/050248 dated May 6, 2020 (11 pages).
Sorbom et al., "ARC: A compact, high-field, fusion nuclear science facility and demonstration power plant with demountable magnets," Fusion Engineering and Design, 2015, vol. 100, pp. 378-405.

CENTRAL COLUMN OF TOROIDAL FIELD COIL

FIELD OF THE INVENTION

The present invention relates to high temperature superconductors (HTS). In particular, the present invention relates to a structure for a toroidal field coil comprising HTS.

BACKGROUND

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30 K. The behaviour of HTS material is not described by BCS theory, and such materials may have critical temperatures above about 30 K (though it should be noted that it is the physical differences in superconducting operation and composition, rather than the critical temperature, which define HTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate ($MgB_2$).

Figure 1:
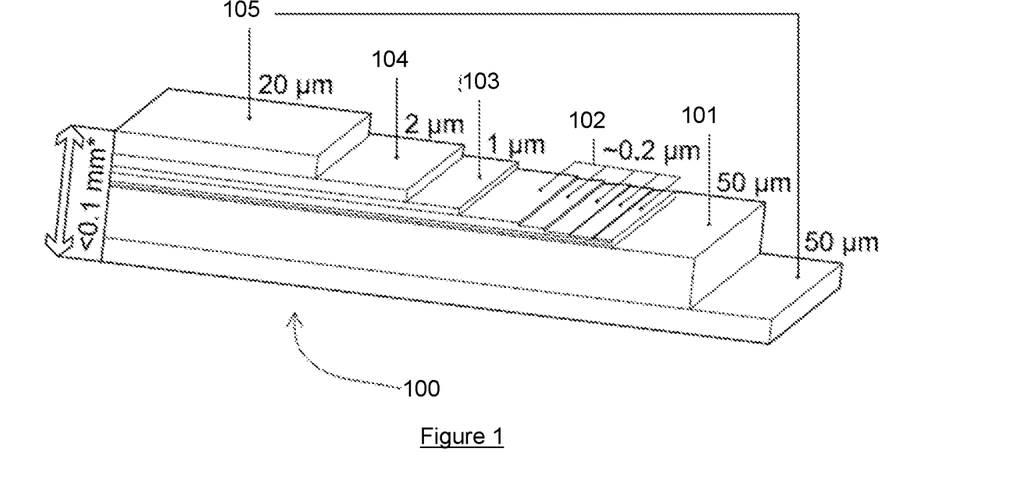
FIG. 1 is a schematic illustration of an HTS tape.

ReBCO is typically manufactured as tapes, with a structure as shown in FIG. 1. Such tape 500 is generally approximately 100 microns thick, and includes a substrate 501 (typically electropolished hastelloy approximately 50 microns thick), on which is deposited by IBAD, magnetron sputtering, or another suitable technique a series of buffer layers known as the buffer stack 502, of approximate thickness 0.2 microns. An epitaxial ReBCO-HTS layer 503 (deposited by MOCVD or another suitable technique) overlays 15 the buffer stack, and is typically 1 micron thick. A 1-2 micron silver layer 504 is deposited on the HTS layer by sputtering or another suitable technique, and a copper stabilizer layer 505 is deposited on the tape by electroplating or another suitable technique, which often completely encapsulates the tape.

The substrate 501 provides a mechanical backbone that can be fed through the manufacturing line and permit growth of subsequent layers. The buffer stack 502 is required to provide a biaxially textured crystalline template upon which to grow the HTS layer, and prevents chemical diffusion of elements from the substrate to the HTS which damage its superconducting properties. The silver layer 504 is required to provide a low resistance interface from the ReBCO to the stabiliser layer, and the stabiliser layer 505 provides an alternative current path in the event that any part of the ReBCO ceases superconducting (enters the "normal" state).

In addition, "exfoliated" HTS tape can be manufactured, which lacks a substrate and buffer stack, and instead has silver layers on both sides of the HTS layer. Tape which has a substrate will be referred to as "substrated" HTS tape.

Figure 2:
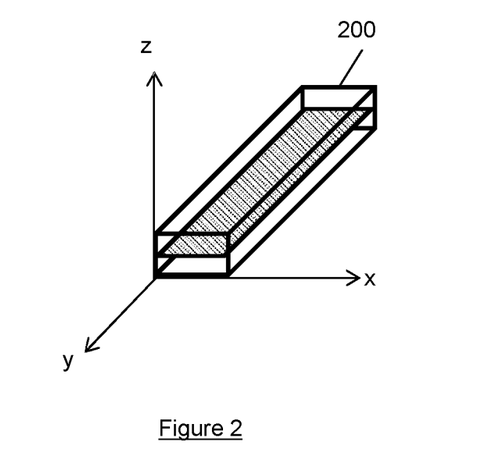
FIG. 2 is an illustration of an HTS tape showing a coordinate axis.

FIG. 2 shows a ReBCO tape 200, illustrating an x,y,z coordinate system which will be used in this document. The y axis is along the length of the tape (i.e. in the direction of the current when the tape is in use), the x axis is along the width of the tape (i.e. in the plane of the tape, perpendicular to the y axis), the z axis is perpendicular to the x and y axes (i.e. normal to the plane of the tape).

Figure 3:
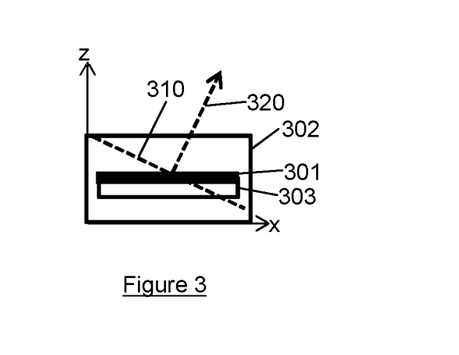
FIG. 3 is a diagram of an HTS tape showing the a-b plane and c-axis of the tape.

FIG. 3 shows a cross section of an exemplary ReBCO tape in the x/z plane. The ReBCO layer itself is crystalline, and the principal axes of the ReBCO crystal are shown for one point in the tape. The ReBCO tape is shown in simplified form with an HTS layer 301, a copper cladding 302, and a substrate 303. The crystal structure of ReBCO has three principal axes which are mutually perpendicular, referred to in the art as a, b, and c. For the purposes of this disclosure, we ignore any dependence of critical current on the orientation of the magnetic field component in the ab plane, so that the a and b axes can be considered interchangeable, so they will be considered only as the a/b plane (i.e. the plane defined by the a and b axes). In FIG. 3 the a/b plane of the ReBCO layer 301 is shown as a single line 310, perpendicular to the c-axis 320.

The critical current of the tape depends on the ReBCO crystal thickness and quality. It also has an approximately inverse dependence on the ambient temperature and also the magnitude of the applied magnetic field. Finally, it also depends on the orientation of the applied magnetic field with respect to the c-axis. When the applied magnetic field vector lies in the a/b plane 310 the critical current is considerably higher than when the applied magnetic field vector is aligned along the c-axis 320. The critical current varies smoothly between these two extremes in "out of a/b plane" field orientation. (In practice, there may be more than one angle at which critical current shows a peak. Furthermore, the amplitude and width of the peaks vary with both applied field and temperature, but for the purposes of this explanation we can consider a tape with a single dominant peak that defines the optimum orientation of applied B field that gives maximum critical current).

ReBCO tapes are normally manufactured so that the c-axis is as close to perpendicular to the plane of the tape as possible. However, some commercially available tapes have a c-axis at an angle of up to 35 degrees from the perpendicular in the x/y plane.

HTS tapes may be arranged into HTS cables. An HTS cable comprises one or more HTS tapes, which are connected along their length via conductive material (normally copper). The HTS tapes may be stacked (i.e. arranged in an array such that the HTS layers are parallel), or they may have some other arrangement of tapes, which may vary along the length of the cable. Notable special cases of HTS cables are single HTS tapes, and HTS pairs. HTS pairs comprise a pair of HTS tapes, arranged such that the HTS layers are parallel. Where substrated tape is used, HTS pairs may be type-0 (with the HTS layers facing each other), type-1 (with the HTS layer of one tape facing the substrate of the other), or type-2 (with the substrates facing each other). Cables comprising more than 2 tapes may arrange some or all of the tapes in HTS pairs. Stacked HTS tapes may comprise various arrangements of HTS pairs, most commonly either an array of type-1 pairs or an array of type-0 pairs and (or, equivalently, type-2 pairs). HTS cables may comprise a mix of substrated and exfoliated tape.

When describing field coils in this document, the following terms will be used:
  "HTS cable"—a cable comprising one or more HTS tapes. In this definition, a single HTS tape can be an HTS cable.
  "turn"—a section of HTS cable within a field coil which encloses the inside of the field coil (i.e. which can be modelled as a complete loop)
  "arc"—a continuous length of the field coil which is less than the whole field coil "inner/outer radius"—the distance from the centre of the field coil to the inside/outside of the HTS cables "inner/outer perimeter"—the distance measured around the inside/outside of the field coil "thickness"—the radial width of all of the turns of the field coil, i.e. the difference between the inner and outer radius "critical current"—the current at which the HTS would become normal, at a given temperature and external magnetic field (where HTS is considered to have "become normal" at a characteristic point of the superconducting transition, where the tape generates $E_0$ volts per metre. The choice of $E_0$ is arbitrary, but is usually taken to be 10 or 100 microvolts per metre.)

"critical temperature"—the temperature at which the HTS would become normal, at a given the magnetic field and current Broadly speaking, there are two types of construction for magnetic field coils—by winding, or by assembling several sections. Wound coils, as shown in FIG. 2, are manufactured by wrapping an HTS cable 201 around a former 202 in a continuous spiral. The former is shaped to provide the required inner perimeter of the field coil, and may be a structural part of the final wound coil, or may be removed after winding. Sectional coils, as shown schematically in FIG. 3, are composed of several sections 301, each of which may contain several cables or preformed busbars 311 and will form an arc of the overall coil. The sections are connected by joints 302 to form the complete coil. While the turns of the coils in FIGS. 2 and 3 are shown spaced apart for clarity, there will generally be material connecting the turns of the coil. The coils may be "insulated"—having electrically insulating material between the turns of the coil, "non insulated", where the turns of the coil are electrically connected radially, as well as along the cables (e.g. by connecting the copper stabiliser layers of the cables by soldering or by direct contact), or "partially insulated", where the material between turns has resistance intermediate between that of a traditional conductor, eg: a metal, and a that of a traditional insulator, such as ceramic or organic insulator. Non-insulated coils are generally not suitable for large field coils, for reasons which will be discussed in more detail later.

Figure 4:
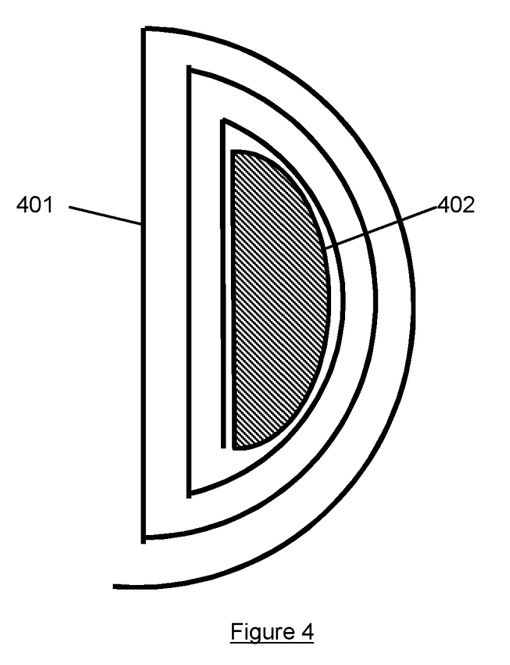
FIG. 4 is a schematic illustration of a wound HTS coil.
Figure 5:
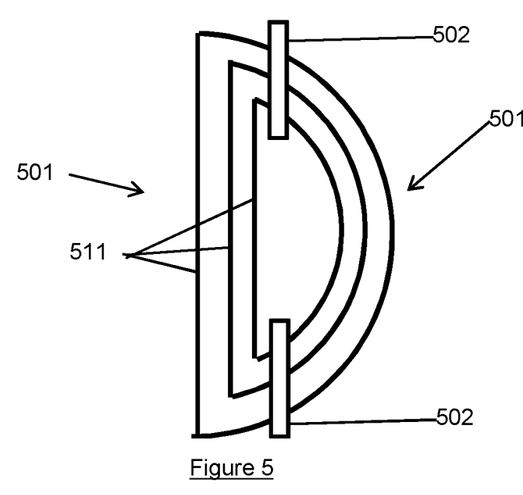
FIG. 5 is a schematic illustration of a sectional HTS coil.
Figure 6:
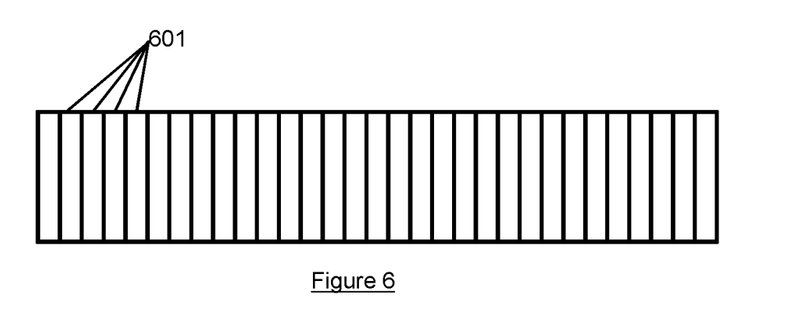
FIG. 6 is a schematic illustration of a cross section of a pancake HTS coil.
Figure 7:
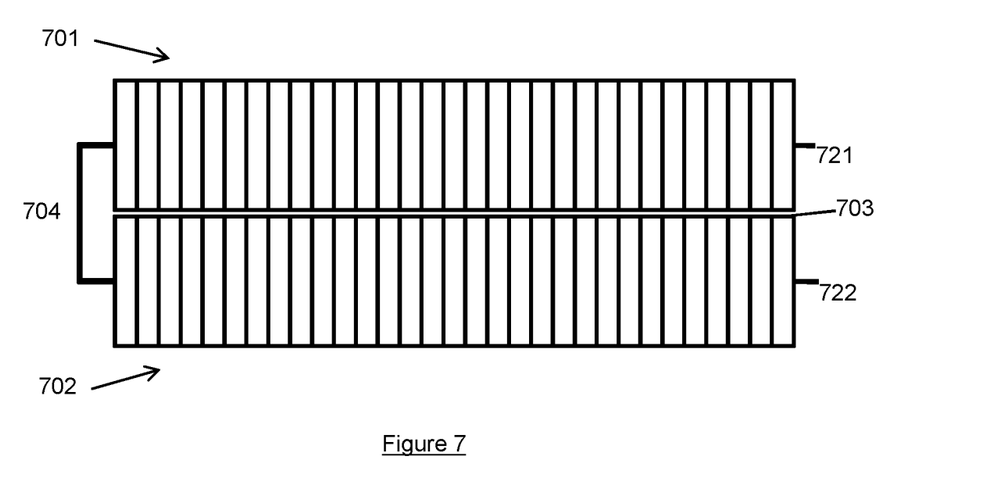
FIG. 7 is a schematic illustration of a cross section of a double pancake HTS coil.

FIG. 4 shows a cross section of a specific type of wound coil known as a "pancake coil", where HTS cables 401 are wrapped to form a flat coil, in a similar manner to a spool of ribbon. Pancake coils may be made with an inner perimeter which is any 2 dimensional shape. Often, pancake coils are provided as a "double pancake coil", as shown in the cross section of FIG. 5, which comprises two pancake coils 501, 502 wound in opposite sense, with insulation 503 between the pancake coils, and with the inner terminals connected together 504. This means that voltage only needs to be supplied to the outer terminals 521, 522, which are generally more accessible, to drive current through the turns of the coil and generate a magnetic field.

Wound coils may be significantly easier to manufacture than coils assembled from jointed busbars, however there are some limitations. For example, in magnets with highly asymmetric field distributions around the coil, it is advantageous to "grade" the cables (or busbars) in the magnet, providing more HTS in regions of high field (and hence low critical current per tape) and less HTS in regions of low field (and hence high critical current per tape). This is clearly not possible in a coil continuously wound from a single, uniform cable, as the amount of HTS in any given cross section through the field coil will be the same around the whole coil (to within a single cable cross section).

Sectional coils can be easily made with graded cables/busbars—simply by providing different amounts of HTS in each section or at different points in each section. However, the joints required for sectional coils present a significant electrical and mechanical engineering challenge, as their resistance must be minimised, they will often be subject to large mechanical loads, and they may require precise alignment. In addition, a sectional coil will always have more resistance than an equivalent wound coil, due to the joints, since all the current has to pass from the HTS in one cable/busbar, through a short distance of resistive material (such as copper) at the joint, and then back into HTS in the second cable/busbar; It is known that the resistance of the ReBCO—Ag interface inside individual HTS tapes represents the limiting factor in the design of HTS cable/busbar joints.

SUMMARY

According to one aspect of the present invention there is provided an HTS assembly for use in a toroidal field coil having a central column. The HTS assembly comprises a plurality of parallel arrays of HTS tapes arranged to pass through the central column, each array comprising a plurality of HTS tapes arranged such that c-axes of all tapes in an array are parallel to each other, and such that planes of the HTS layers of the HTS tapes are perpendicular to a first radius of the central column. Each HTS tape has a c-angle which is an angle between a perpendicular to a plane of an HTS layer of the HTS tape and the c-axis of the tape. The plurality of arrays comprises first and second sets of arrays. Each array within the first set of arrays comprises HTS tapes of a first type having a first c-angle, and each array within the second set of arrays comprises HTS tapes of a second type having a second c-angle which is greater than the first c-angle. The first set of arrays are arranged closer to the first radius than the second set of arrays.

According to another aspect, a central column for a toroidal field coil comprises a plurality of HTS assemblies as described above, wherein the HTS assemblies are arranged as segments of the central column.

According to a further aspect, there is provided a toroidal field coil comprising a central column as described above.

Further embodiments are presented in claim 2 et seq.

DETAILED DESCRIPTION

Figure 8:
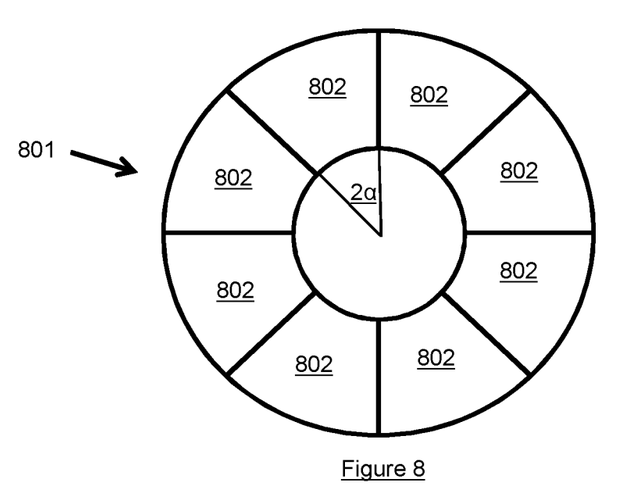
FIG. 8 is a schematic illustration of a cross section of a central column of a toroidal field coil.
Figure 9:
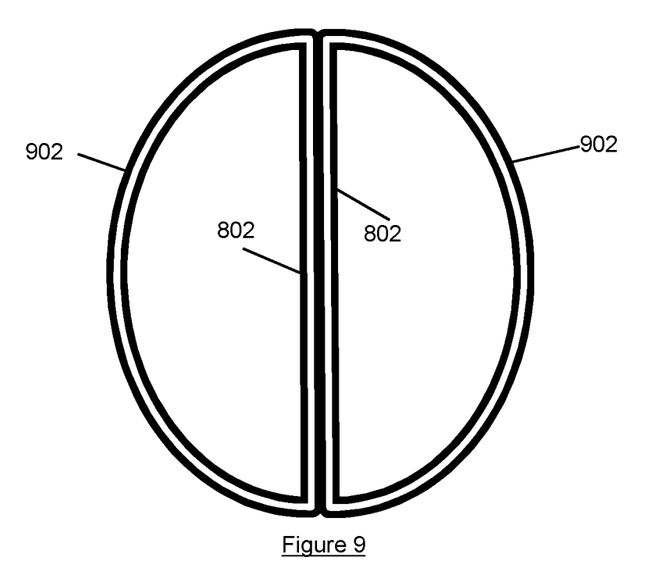
FIG. 9 is a schematic illustration of a toroidal field coil.

A toroidal field coil for a tokamak plasma chamber (or other applications) comprises a central column and a plurality of return limbs. FIG. 8 shows a cross section of the central column 801, which is divided into N segments 802 (N=8 in this example). Each segment subtends an angle $2\alpha$, where $2\alpha=360/N$ degrees Each segment 802 corresponds to one or more of the return limbs, and, as shown in FIG. 9 the return limbs 902 each form a coil with the respective segment 802.

One method of manufacturing a toroidal field coil is to manufacture N D-shaped wound coils using arrayed HTS cables, with the "upright" of each D-shaped coil being a segment which is 1/N of the central column, and assemble the coils to form the complete toroidal field coil. However, such a construction will suffer from one of two issues:

If the individual coils are arranged such that the HTS tapes closely align with the magnetic field (i.e. such that the c-axes are directed approximately radially from the central column), then each wound coil would only be a single HTS tape wide (or two HTS tapes wide if double pancake coils are used, as is usually the case), and the number of coils required would be large (e.g. greater than 200). Such an arrangement would be challenging to manufacture, and limits the space between return limbs which will make it difficult to work on components within the toroidal field coil (e.g. a plasma chamber and/or poloidal field coils)

If the coils are constructed to be multiple tapes wide (ie: from stacks of double pancakes), in order to allow a construction with fewer return limbs, then the HTS tapes in the outer pancakes in each stack will not align with the magnetic fields (with the degree of misalignment increasing towards the edge of the stack), which will reduce the critical current of the HTS.

An alternative construction is proposed below, using multiple types of HTS tape, each with a different c-angle (angle between the c-plane and the perpendicular to the plane of the HTS tape). While the problem has been stated above in terms of wound HTS coils, the skilled person will appreciate that the construction could also be used in sectional HTS coils, with a central column section having the properties of the central column of the wound HTS coils presented below.

Figure 10:
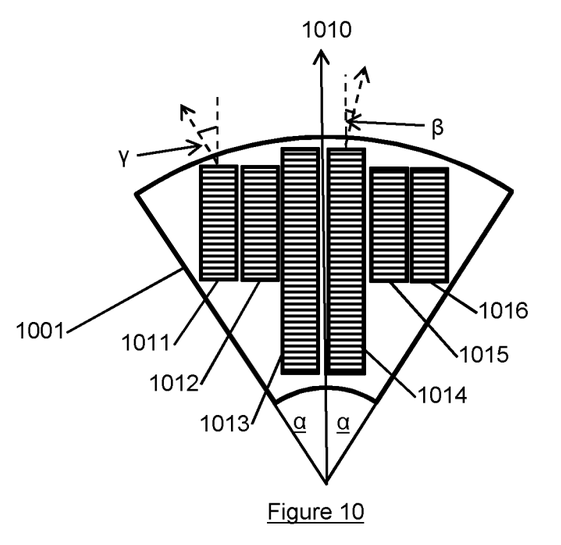
FIG. 10 is a schematic illustration of a cross section of a segment of an exemplary central column.

FIG. 10 is a cross section of one segment 1001 of an exemplary central column. Each segment may have the same structure. The segment 1001 comprises several parallel arrays of HTS tape 1011, 1012, 1013, 1014, 1015, 1016, which are oriented with the HTS layers perpendicular to a radius 1010 which passes through the segment (e.g. through the midpoint of the arrays as measured tangentially). While six arrays are shown in this example, the number of arrays will depend on the dimensions of the segment and the HTS tape. The arrays may be parts of single or double pancake coils Two types of HTS tape are used in the arrays 1011 to 1016. The first type of HTS tape has a c-angle $\beta$ and the second type of HTS tape has a c-angle $\gamma$ which is greater than the c-angle $\beta$ of the first type of HTS tape. Arrays 1013, 1014 towards the centre of the segment are made from the first type of HTS tape. Arrays 1011, 1012, 1015, 1016 towards the outer edges of the segment (measured tangentially) are made from the second type of HTS tape. Arrays to the left of the centre of the segment have the c-axis oriented pointing leftwards, and arrays to the right of the centre of the segment have the c-axis oriented pointing rightwards.

In general the type of HTS tape used for each array may be chosen to provide the best alignment between the a/b planes of HTS tapes in the array and the magnetic field of the central column. However, the "best alignment" will depend on the specific design of the central column. Considering only the magnetic field, the best alignment will generally be that for which the angle between the c-axis and the radius of the central column is minimised towards the radially outer end of each array (as the magnetic field is highest towards the outside of the central column), but depending on the heat loads and stresses experienced by the central column it may be beneficial to minimise the angle between the c-axis and the radius of the central column at some other point in the array. In general, however, arrays which are a greater distance from the radius 1010 of the central column which is perpendicular to the HTS tape will have a greater c-angle than arrays which are closer to that radius.

More than two types of HTS tape may be used, with each having a different c-angle, with the HTS tapes having a greater c-angle being located further from the radius perpendicular to the HTS tapes.

Figure 11:
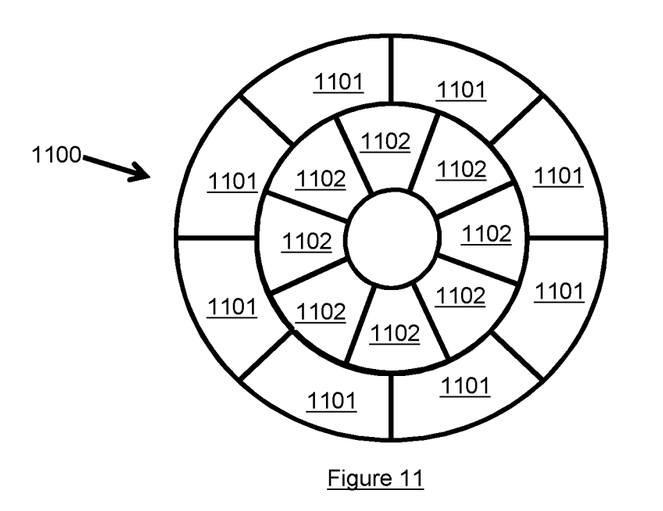
FIG. 11 is a schematic illustration of a cross section of a further exemplary central column.

The number of segments N may be chosen to ensure that the maximum c-angle is approximately $\alpha$, e.g. within ten degrees of $\alpha$. For wound coils, the fewer segments there are the fewer return limbs there will be. In order to improve the uniformity of the toroidal field, the number of return limbs may be increased without reducing the segment angle $\alpha$ by providing two layers of segments, as shown in FIG. 11. FIG. 11 shows a cross section of a central column 1100 first layer of segments 1101 and a second layer of segments 1102, each of which is constructed in a similar manner to the segment 1001 as described above. The first layer of segments 1101 is positioned radially outwards of the second layer of segments, and offset from the second layer of segments 1102 by the segment angle $\alpha$, such that a midpoint of each segment of one layer lies on the same radius as a join between segments in the other layer. This arrangement ensures that the return limbs corresponding to each segment are evenly spread around the toroidal field coil.

Figure 12:
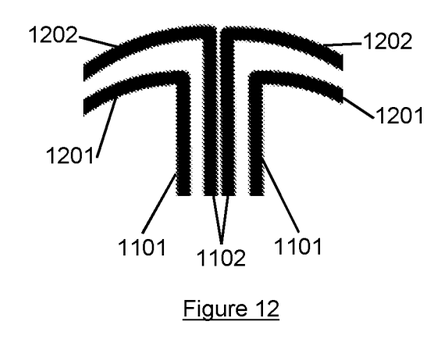
FIG. 12 is a schematic illustration of the transition between the central column of FIG. 11 and the return limbs of the toroidal field coil.

FIG. 12 schematically illustrates the top of a central column according to FIG. 11, showing the transition from the central column segments 1101, 1102 to the corresponding return limbs 1201, 1202. The return limbs 1201 corresponding to the outer segments 1101 of the central column are shorter in height than the return limbs 1202 corresponding to the inner segments 1102 of the central column, to allow the toroidal field coil to be assembled more easily. This has the additional advantage of separating out the transition areas between each return limb and each central column segment, which tend to be regions of high heat load in a toroidal field coil. The return limbs 1201, 1202 are spaced at equal angles and have equal radius at the centre plane. Again, while the problem has been specified in terms of wound coils, the arrangement of FIGS. 11 and 12 may be replicated in sectional coils.

The invention claimed is:

1. A central column for a toroidal field coil, the central column comprising a plurality of segments (1001), each segment comprising first and second sets of parallel arrays of HTS tapes, the HTS tapes arranged such that c-axes of ReBCO crystal structures of the HTS tapes within each array are parallel to each other, and such that planes of the HTS layers of the HTS tapes within each segment are perpendicular to a respective radius (1010) of the central column which passes through the segment, wherein:

each HTS tape has a c-angle which is an angle between a perpendicular to a plane of an HTS layer of the HTS tape and the c-axis of the ReBCO crystal structure of the tape;

the HTS tapes of each array (1013) within the first set of arrays are HTS tapes having a first c-angle;

the HTS tapes of each array (1011, 1012) within the second set of arrays are HTS tapes having a second c-angle which is greater than the first c-angle;

wherein, within each segment, the first set of arrays are arranged closer to the respective radius than the second set of arrays.

2. A central column according to claim 1, wherein the each segment comprises one or more further sets of arrays comprising HTS tape having respective further c-angles, and wherein, within each segment, each set of arrays is arranged closer to the respective radius than sets of arrays comprising HTS tape having greater c-angles.

3. A central column according to claim 1, wherein each set of arrays is arranged such that a further radius of the central column passes through at least one array of the set of arrays, the further radius being at an angle from the respective radius equal to a c-angle of the HTS tape of that set of arrays.

4. A central column according to claim 1, and comprising two layers of segments, wherein a first layer of segments is located radially outward of a second layer of segments.

5. A toroidal field coil comprising a central column according to claim 4, wherein return limbs of the toroidal field coil which are connected to HTS assemblies of the second layer have a greater vertical extent than return limbs of the toroidal field coil which are connected to HTS assemblies of the first layer.

6. A central column according to claim 1, and comprising joints at either end of the central column.

7. A toroidal field coil comprising a central column according to claim 1.

8. A toroidal field coil comprising a central column according to claim 1, wherein each array of HTS tapes is an arc of a wound HTS coil.

* * * * *